1,974,878

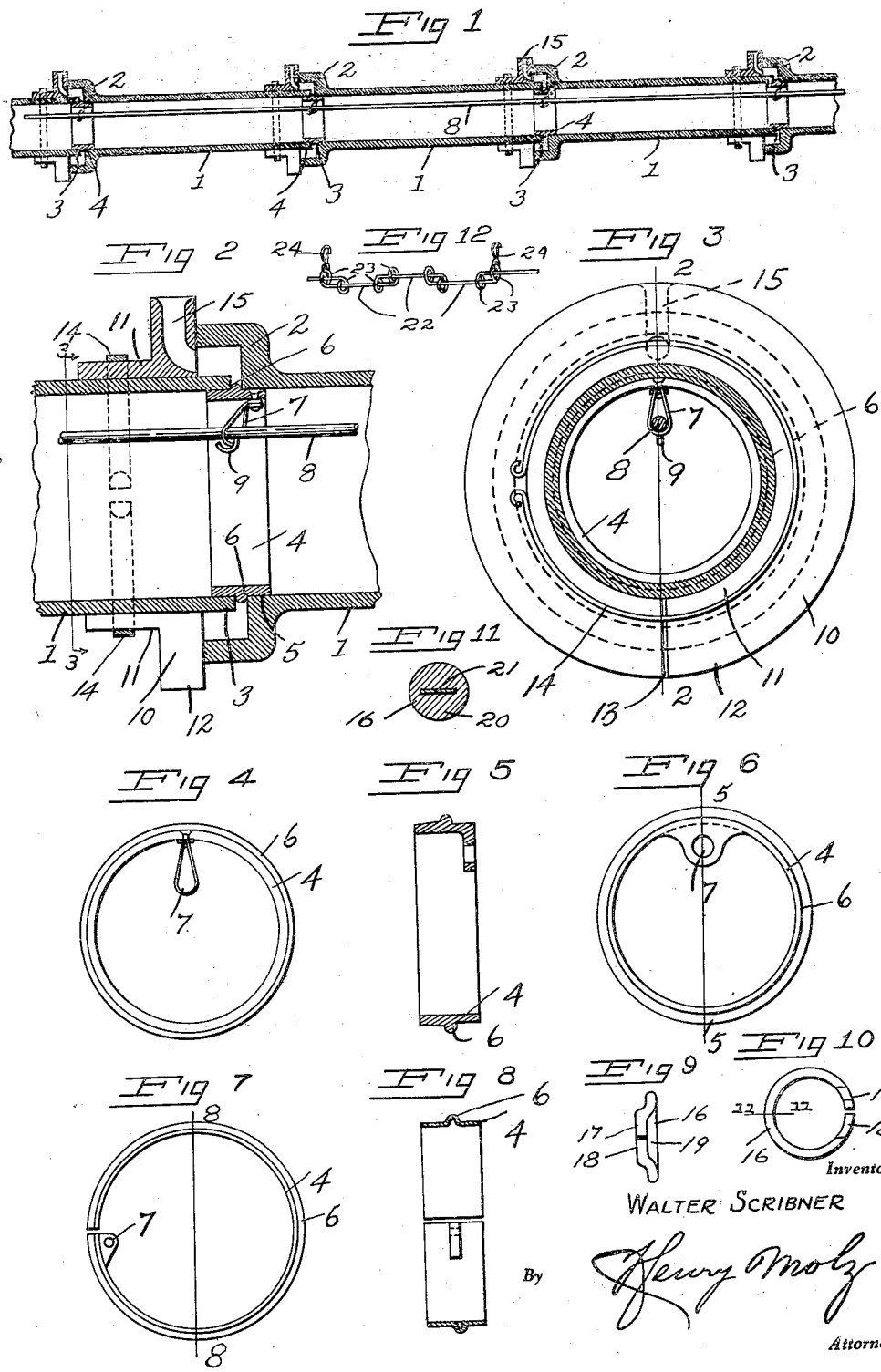
Sept. 25, 1934. W. SCRIBNER 1,974,878
PIPE SEALING AND CENTERING APPARATUS
Filed June 26, 1933
Inventor
WALTER SCRIBNER
By Henry Molz
Attorney Patented Sept. 25, 1934

UNITED STATES PATENT OFFICE 1,974,878

PIPE SEALING AND CENTERING APPARATUS

Walter Scribner, Glendale, Calif.

Application June 26, 1933, Serial No. 677,536

6 Claims. (Cl. 25—127)

The primary object of my invention is the provision of a means for effectively, economically and efficiently sealing the joints of pipe irrespective of size, both within or without the pipe ditch.

It is the object of my invention thus to thoroughly seal a pipe joint in a more simple, quicker, tighter and satisfactory manner than present day pipe sealing methods permit.

A further object is to produce a seal between the joints of pipe sections that will effectively prevent root growth from entering the joint and thus prevent all possibility of such growth entering the interior of the pipe line and obstructing the same.

A further object is to produce a seal capable of withstanding a greater pressure than now experienced by the methods of sealing employed.

A still further object is to provide a sealed joint between the pipe sections that may be readily sealed with any of the common liquid or semi-liquid sealing materials, such as asphaltum, sulphur, lead, cement, etc.

A further object is the provision of a means for sealing the joints of pipe sections which eliminates the customary method of stuffing the pipe bell with paper in order to retain the sealing material during its setting process, as well as the card board ring or collar held in place by backing with ditch dirt or clay, for the same purpose. Thus my seal takes up all of the space of the pipe joint, irrespective of size. It leaves no temporary filled in space which in time by deterioration of the filler becomes apparent and a haven for objectionable plant growth.

Another important object is the provision of a means whereby a string of pipe sections may be effectively sealed to assure the above objects, and whereby the sealing apparatus may be reused over and over again.

Another important object is the provision of such means wherein certain of the apparatus may be left in the interior of the pipe at each joint in a long string of jointed sections, and simultaneously removed from the entire string when all of the sealed joints have thoroughly set, or previous thereto, if necessary, by the simple operation of withdrawing the same at the last sealed joint of the string.

And a still further object is the provision of a pipe sealing apparatus that will during the sealing process effectively self center the spigot end of a pipe length inserted into the bell end of a second pipe length, and assure an even surface of the meeting ends, so that the surface area at the connecting joint interiorly the pipe body will set flush and form no obstruction to retard the pipe flow.

I attain these objects by the apparatus illustrated in the accompanying drawing, in which:

Figure 1 shows a number of pipe sections jointed to each other with my apparatus in place;

Figure 2 is an enlarged section of one of the pipe joints taken on the line 2—2 of Fig. 3;

Figure 3 is a view taken on the line 3—3 of Fig. 2;

Figure 4 is an end view of one of the inner rings of my apparatus;

Figure 5 is a section taken on the line 5—5 of Fig. 6;

Figure 6 is an end view of a form of ring made entirely of flexible material;

Figure 7 is an end view of a ring made of thin metal or paper pulp;

Figure 8 is a section on the line 8—8 of Fig. 7;

Figure 9 is a side elevation of a modified form of collar;

Figure 10 is a front view of Fig. 9;

Figure 11 is an enlarged sectional view taken on the line 11—11 of Fig. 10, and

Figure 12 is a fragmentary view of a modified form of withdrawing tool.

Similar numerals of reference indicate like parts throughout the several views, the numeral 1 thus indicating a standard section of pipe, 2 the bell thereof and wherein is shown the end 3 of the pipe section 1. A ring or collar 4 is positioned partly into the pipe body 5 against said bell 2 and partly into the pipe end 3 so as to overlap them both, a bead or rib 6 integral said ring 4 engaging the joint and holding it somewhat apart for the placement of a joint seal and functioning to hold the ring 4 against lateral movement in the pipe body. Secured to the ring 4 is an attaching means comprising an eye 7 for the engaging of a withdrawing tool to remove the ring from the pipe, a ring withdrawing tool 8 having a plurality of pre-determined spaced hooks 9 adapted to engage with said eye 7 permitting a multiplicity of rings 4 to be set in a string of joined pipe sections and to be readily disengaged from each joint and withdrawn from the pipe string for additional use.

Exteriorly of the pipe sections so as to encompass them at each joint, I place a collar 10 split as at 13 and having a formed neck 11, a flange 12 and an aperture or funnel opening 15. The flange 12 fits against the bell 2 and closes the space formed by the joint created in engaging the end 3 of the pipe section therewith, excepting that portion of the collar comprising the funnel 15, and through which the joint sealing material is introduced into the pipe joint. The ring 4 interiorly positioned of the pipe body so as to overlap the interior portion of the joint acts as a stopper to prevent the sealing material from flowing out of the joint as fast as it is poured therein from without through said funnel means 15. Thus the sealing material is provided with a positive housing during its setting process When set, the entire apparatus, comprising the outer collar 10, the interior ring 4, and the withdrawing tool 8 by means of which the ring 4 is withdrawn are removed for further use.

So that the split collar 10 may the more securely encompass the pipe, I provide a snap ring 14 adapted to engage the collar. The collar 16 is preferably formed of a flexible material such as rubber, indicated in Fig. 11 as 20, the respective ends 17 and 18 are formed to bend outward and upward so as to form a well or funnel means 19 for the introduction of the joint sealing material, the collar encompassing the pipe adjacent the exterior opening of the pipe joint so as to close the same. Interiorly of the flexible material 20 is a metallic spring like reinforcement 21 tending to retain the collar 16 in a circular formation and to snugly have it encompass the pipe.

The withdrawing tool illustrated in Fig. 12 comprises a plurality of rod members 22, the ends of which are bent so as to turn upon themselves as at 23, and form a plurality of recesses through which certain of the rod members pass forming a link of rods, which when drawn taut, by interlocking at said recessed bends form a continuous length, a snap hook 24 is attached to each alternate rod section for engagement with the eye 7 of the split ring 4, the length of the rod members 22 being pre-determined so that the snap hooks 24 will be positioned at correct intervals for engagement with said split ring 4 at each jointure of the pipe sections in the pipe string.

In practice, the ring 4 may be economically produced from any suitable material such as sheet rubber, composition material or metal. Under certain conditions, as in extremely difficult bends, rings of paper pulp may be advantageously used. These owing to their low cost may be left in place, the contents of the pipe line in time readily washing them away.

The ring withdrawing tool 8 may be of any convenient length. It may readily be made of a plurality of engageable lengths. The hooks are attached to the ring eye 7 as each ring is set, a pull on the tool readily disengaging each ring from the pipe joint and carying it out of the body of the pipe for further use.

As defined in the object clauses, present day pipe sealing methods are carried out by simply pouring the sealing material into the joint which has been stuffed with newspaper or rope to form a stopper for the sealing material pending its setting. As paper and rope deteriorates and rots away, the space occupied becomes a haven for plant and root growth. Either or both have a normal tendency to clog the pipe and in time, weaken if not entirely destroy the joint. This is serious. It is positively overcome with the use of my apparatus.

The apparatus positioned within the pipe body so as to effectively close the joint resulting from the engagement of the spigot end of one pipe section with the bell end of another pipe section, not only serves to close the joint opening, but also centers the engaging bell end with the engaging spigot end so as to positively position both of said jointed ends flush with one another. No prop means to hold up the spigot end of the bell jointed pipe section being necessary to center the pipe sections as is customary in present day pipe joint sealing practice.

Readily produced from materials obtainable in the open market and at no great cost, light in weight, easily carried from job to job, and unbreakable, the apparatus commends itself for simplicity and satisfaction in operation. It makes a solid pipe joint having no space therebetween.

I am aware that slight modifications may from time to time be made in the details of structure illustrated without departing, however, from the scope of the present invention, and as defined in the claims which are appended hereto. Hence, I do not limit my present invention to the exact description of construction herein disclosed, but what I do claim is:—

1. In an apparatus for jointing pipe sections to provide continuity in a pipe line, in combination with a plurality of pipe sections, and a pipe engaging collar having an aperture therethrough for the introduction of the joint seal, a split ring having a rib, said split ring adapted to overlap internally the pipe body and enclose the pipe joint formed by the engaging of said plurality of pipe sections one to the other and to center said jointed ends, said ring rib adapted to fit therebetween, and whereby the pipe joint sealing material introduced in said pipe joint through said aperture in said collar is constrained from escaping during the setting process, an eye engaging said split ring and adapted to engage a ring withdrawing means whereby said split ring is brought out of engagement with said pipe joint and removed from the said interior of the pipe body, for further use.

2. In apparatus for sealing and centering the joints of engaging pipe sections, an interior pipe joint closure means comprising ring means adapted to fit over the pipe joint within the pipe body, and having a rib portion adapted to engage in the pipe joint and functioning to retain said ring means in stationary relation to said pipe joint, attaching means on said ring means for engaging a ring withdrawing means, said means comprising rod means consisting of a plurality of jointed members comprising a plurality of recessed spaced bends having independent rod sections passing therethrough so as to interlock at said bends, hook means in engagement with said independent rod sections, said hook means engaging said attaching means on said ring means and forming a ring withdrawal means operating upon relative longitudinal movement of said jointed members to force said ring from engagement with said pipe joint and from said pipe body.

3. In apparatus for jointing and self centering sections of pipe, a split ring adapted to overlap the pipe joint interiorly the pipe body, an annular outstanding rib at right angles therefrom and integral therewith, an eye, said eye engaging said split ring and adapted to disengage said split ring from the pipe joint and for the withdrawal of said split ring from the pipe body, for reuse.

4. In apparatus for use in jointing and self centering separate sections of pipe at their intermediate adjoining ends, a split ring adaptable to be interposed between said adjoining ends and to overlap the same so as to close the opening of the joint formed by the meeting of said adjoining ends, an eye member attached to said split ring and adapted to detachable engagement with an engageable hook means, a rod comprising a plurality of interlocking recessed parts movably affixed to one another, hook means in engagement therewith and adaptable to engage said eye means on said split rings, and yieldable to permit the disengaging of said split rings from said pipe jointure upon relative longitudinal movement of said rod comprising said plurality of interlocking recessed parts.

5. In apparatus for jointing and self centering pipe sections, in combination with a plurality of pipe sections laid end to end, a split ring having an integral rib portion at right angles thereto and adaptable to fit between the intermediate adjoining portions of the pipe section ends forming the pipe joint interiorly the pipe body, and to overlap said pipe joints so as to close the same, an eye member engaging said split ring, a hook engaging member for the engagement of said eye member and whereby said split ring is disengaged from said pipe joint upon the withdrawal of said hook engaging member out of the pipe body.

6. In a pipe jointing and centering apparatus, an interlocking linked hooked member embracing a plurality of spaced bends adaptable to detachable engagement with a plurality of joint closure rings, a joint closure ring, said ring overlapping the pipe joint interiorly the pipe body and having an integral rib portion outstanding at right angles thereto, said joint closure ring adaptable to engagement with said interlocking linked hooked member, and said rib adaptable to fit in between said pipe joint and close the same, said interlocking linked hooked member on longitudinal movement out of the pipe body successively drawing said plurality of spaced bends taut and simultaneously therewith, disengaging said plurality of joint closure rings, one after another, from said joint closure rings and out of said pipe body for reuse.

WALTER SCRIBNER.